United States Patent [19]

Aoshima

[11] Patent Number: 5,152,365
[45] Date of Patent: Oct. 6, 1992

[54] AIR INTAKE SYSTEM FOR SMALL SNOWMOBILE

[75] Inventor: Yasushi Aoshima, Iwata, Japan

[73] Assignee: Yamaha Hatsudoki Kabushiki Kaisha, Iwata, Japan

[21] Appl. No.: 639,963

[22] Filed: Jan. 11, 1991

[30] Foreign Application Priority Data

Jan. 12, 1990 [JP] Japan .................. 2-3329

[51] Int. Cl.⁵ .............................. B60K 13/02
[52] U.S. Cl. .................. 180/68.3; 180/68.2; 123/41.7; 123/198 E
[58] Field of Search .............. 180/68.2, 68.3, 69.2; 123/41.6, 41.62, 41.7, 41.04, 178 E; 55/385.3

[56] References Cited

U.S. PATENT DOCUMENTS 2,881,860  4/1959  Ternes ..................... 180/68.3
4,848,294  7/1989  Yamamoto ............... 123/198 E
4,892,164  1/1990  Yasui et al. ............. 180/68.3

FOREIGN PATENT DOCUMENTS 56-23131  5/1981  Japan .
144282    6/1990  Japan ..................... 180/68.3

Primary Examiner—Andres Kashnikow
Assistant Examiner—Richard Camby
Attorney, Agent, or Firm—Ernest A. Beutler

[57] ABSTRACT

An air intake system for a snowmobile which comprises an internal combustion engine having an induction system. A body is provided which cooperates in defining an engine compartment wherein the engine and induction system are contained. This body has an opening for inducting air from the atmosphere and is in communication with a passageway which defines an air flow path from the opening to the induction system so that air flows from the opening to the induction system without accumulating in the engine compartment. A filter element is positioned between the opening and the induction system across the air flow path such that the air flows in a generally upward direction through the filter element. The filter element not only prevents snow and ice from being sucked into the induction system but also prevents these elements from clogging the filter, while still allowing for adequate air flow to the induction system.

4 Claims, 8 Drawing Sheets

AIR INTAKE SYSTEM FOR SMALL SNOWMOBILE

BACKGROUND OF THE INVENTION

This invention relates to an air intake system for a small snowmobile, and more particularly to an improved construction for providing adequate air flow to the induction system of a small snowmobile which improves the charging efficiency of the intake air and which increases the engine output.

Snowmobiles are highly popular vehicles for both recreational and work purposes in areas where there is a sufficient amount of snow in which to operate them. One type of small snowmobile has been provided which includes an engine compartment formed in its front portion forwardly of the seat and which is enclosed in part by a bottom cover and a top shroud. The engine and its associated components including a carburetor are disposed within this engine compartment, and typically the carburetor is opened within the engine compartment so that it will draw in air which has accumulated within the compartment. An example of such a snowmobile is set forth in Japanese 51-93516.

With this type of arrangement, outside air is introduced into the engine compartment for induction into the carburetor. However, because the engine compartment is enclosed, the heat from the engine and exhaust system components which tends to accumulate within the engine compartment causes the temperature in the engine compartment to be much higher than the temperature outside. Thus, if only this heated air within the engine compartment is inducted into the intake system as has been conventional, the intake air will have a relatively low charging efficiency which, in turn, will decrease the output of the engine.

It is, therefore, a principal object of this invention to provide an improved air intake system for a small snowmobile which reduces or eliminates the above disadvantages.

It is a further object of this invention to provide an improved air intake system for a small snowmobile which employs an opening for drawing in outside air and an intake passage for providing a flow path for this air directly to the engine induction system without accumulating in an engine compartment so as to increase the charging efficiency of the intake air and to increase engine output.

It is yet another object of this invention to provide an air intake system for a small snowmobile wherein outside air flows into the induction system through a filter which is positioned not only to prevent snow from entering the induction system but also to prevent snow from clogging or freezing the filter while still allowing sufficient air flow through it so that the charging efficiency of the intake air and engine output may be increased.

SUMMARY OF THE INVENTION

This invention is adapted to be embodied in an air intake system for a vehicle, preferably a snowmobile, which comprises an internal combustion engine having an induction system. A body is provided which cooperates in defining an engine compartment wherein the engine and induction system are contained. The body has an opening for inducting air from the atmosphere and is in communication with passage means which defines an air flow path from the opening to the induction system so that air flows from the opening to the induction system without accumulating in said engine compartment. A filter element is positioned between the opening and the induction system across the air flow path such that the air flows in a generally upward direction through the filter element.

DETAILED DESCRIPTION OF THE PREFERRED EMBODIMENT OF THE INVENTION

Figure 1:
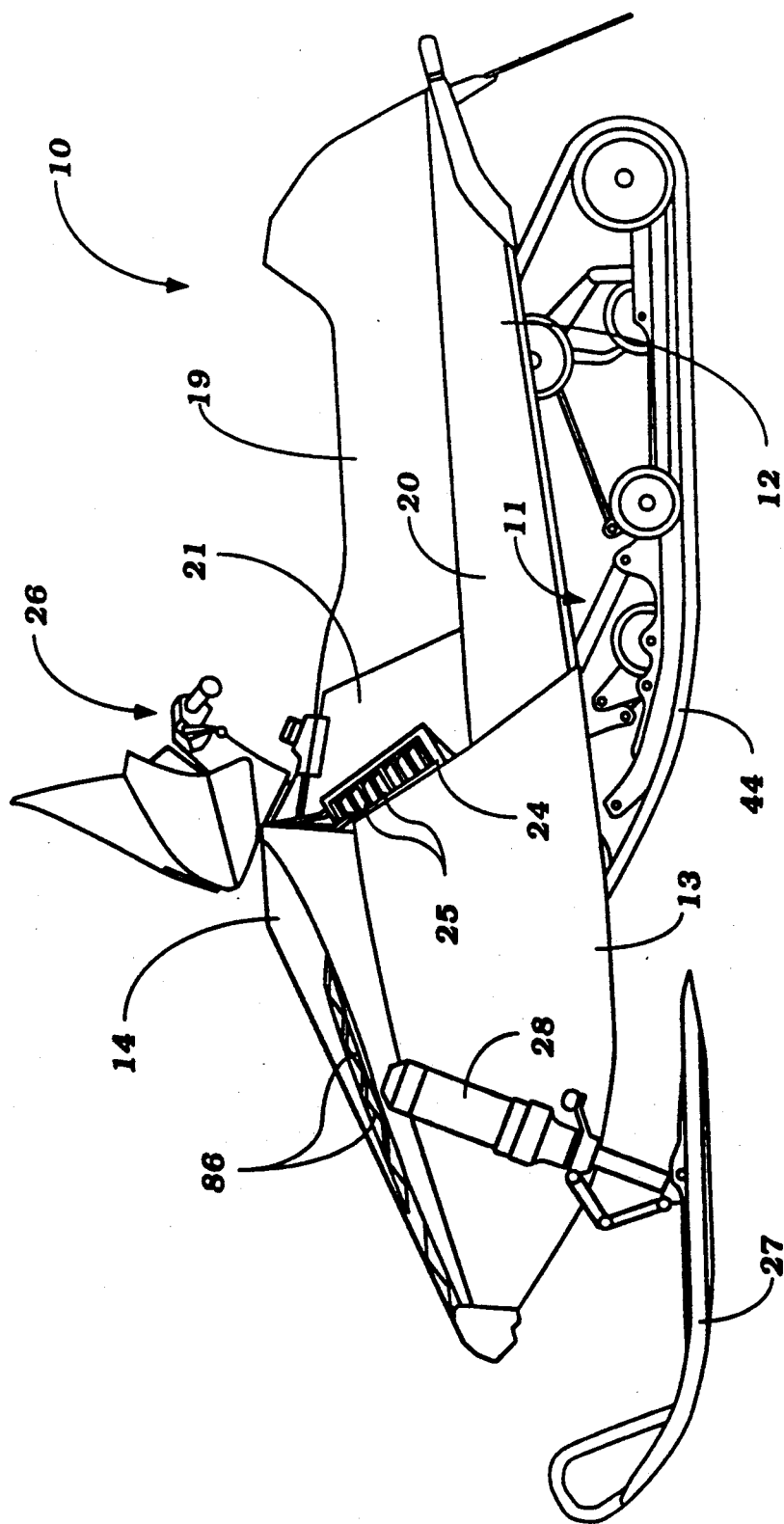
FIG. 1 is a side elevational view of a small snowmobile constructed in accordance with an embodiment of the invention.
Figure 2:
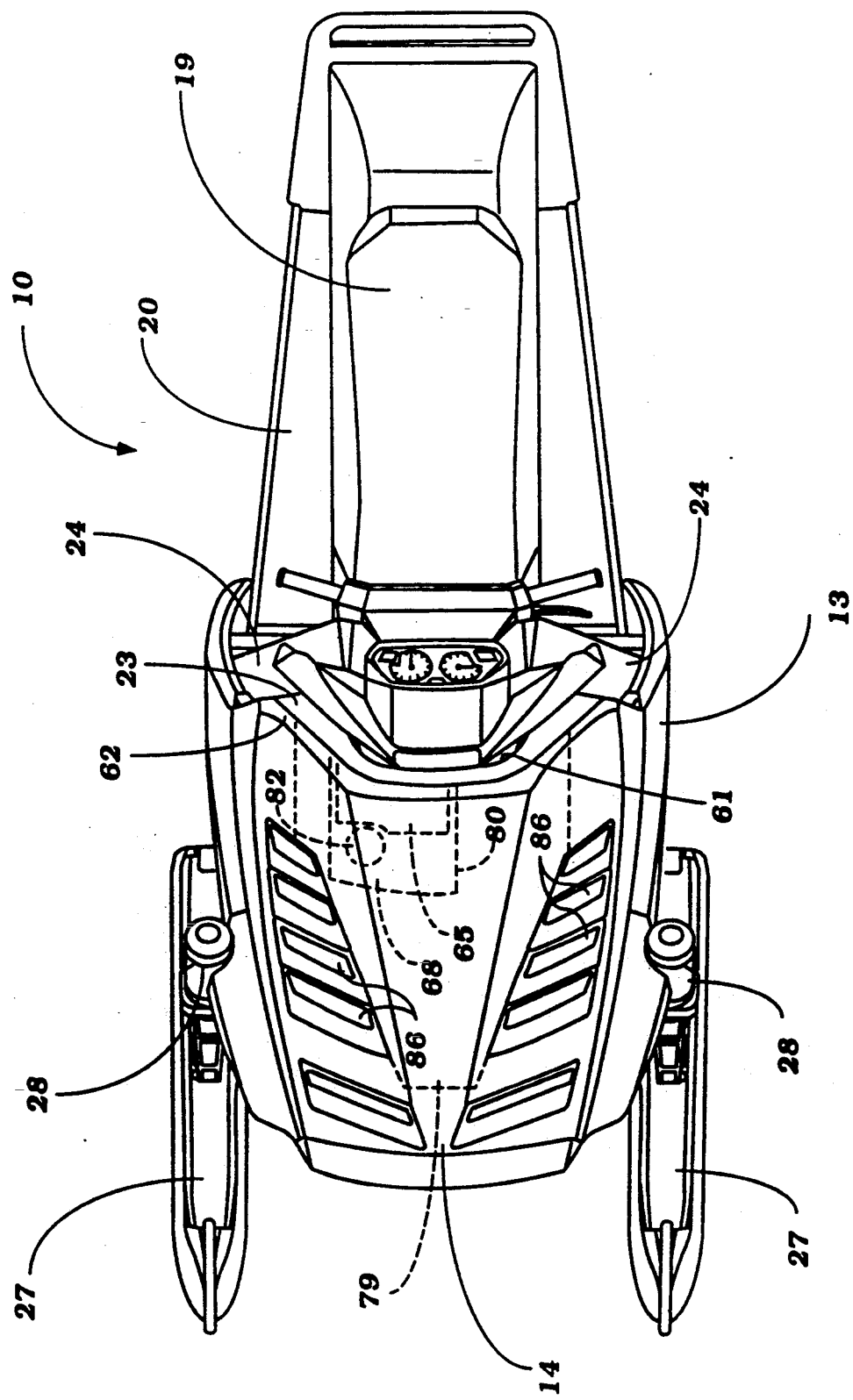
FIG. 2 is a top plan view of the small snowmobile constructed in accordance with an embodiment of the invention.

Referring first primarily to FIGS. 1, 2, 3 and 4, a small snowmobile constructed in accordance with an embodiment of the invention is identified generally by the reference numeral 10. The small snowmobile 10 is designed to be operated primarily by one or two riders and is of lightweight construction. The snowmobile 10 includes a frame assembly 11 which may be of any known type, but which preferably is formed of an open tubular construction for light weight and high strength.

Figure 3:
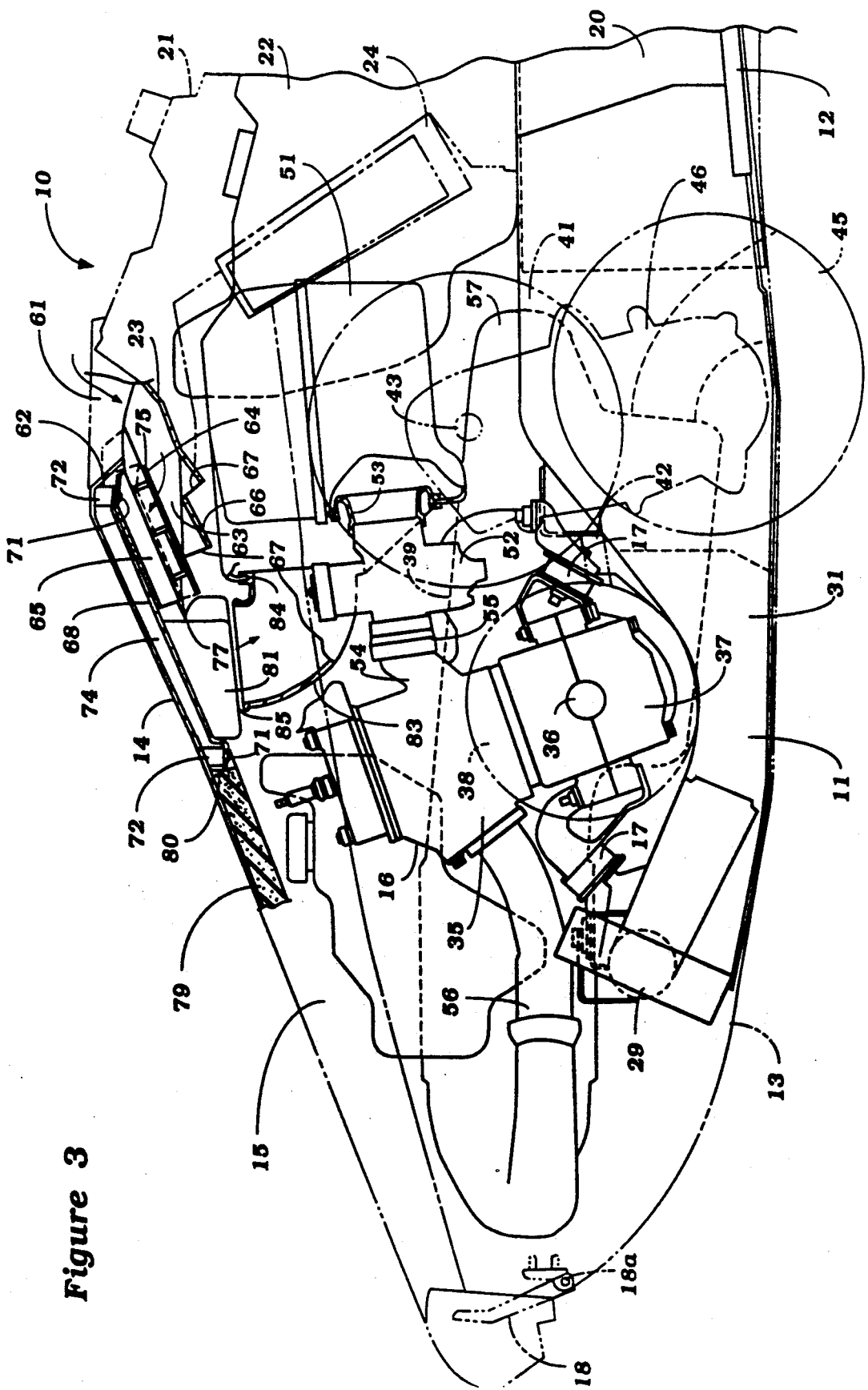
FIG. 3 is a side view of the body of the snowmobile with portions shown in cross section and other portions broken away.

A body 12 which may be formed from molded fiberglass or the like is carried by the frame 11 and includes a bottom cover 13 and a top cover or shroud portion 14 which cooperate to define an engine compartment 15 within which a power unit 16 is contained. The power unit 16 is bolted to the frame 11 with rubber members 17 interposed in between to reduce vibration. The body members 13 and 14 are connected at their forward ends by means of a hinge bracket 18 so that the top shroud 14 may be pivoted about a pivot axis 18a relative to the bottom cover 13 between a closed position as shown in FIG. 3 and an open position wherein the top shroud is pivoted upward so as to provide access to the engine compartment 15.

A seat 19 is supported on the frame 11 and, as previously noted, is adapted to accommodate one or two riders. A pair of foot areas 20 are disposed on opposite sides of the seat 19 and have side panels which extend upwardly from the outer edges thereof. These panels also form part of the body 12. A fuel tank cover 21 overlies a fuel tank 22 which is supported by the frame 11 forwardly of the seat 19. Formed integrally with this fuel tank cover 21 is a cover piece 23 which extends forwardly from the tank cover 21 and cooperates in defining an air intake passage to be described. A pair of plates 24 formed integrally with the cover piece 23 extend downwardly on either side of the fuel tank cover 21 and have louver-type discharge ports 25 formed therein.

A handlebar assembly 26 is carried by the frame 11 forwardly of the seat 19 for steering a pair of skis 27 dirigibly supported by a pair of shock absorbers 28 which are affixed to a transverse frame member 29 that is carried by a pair of down tubes 31 which also form part of the frame assembly 11.

Figure 4:
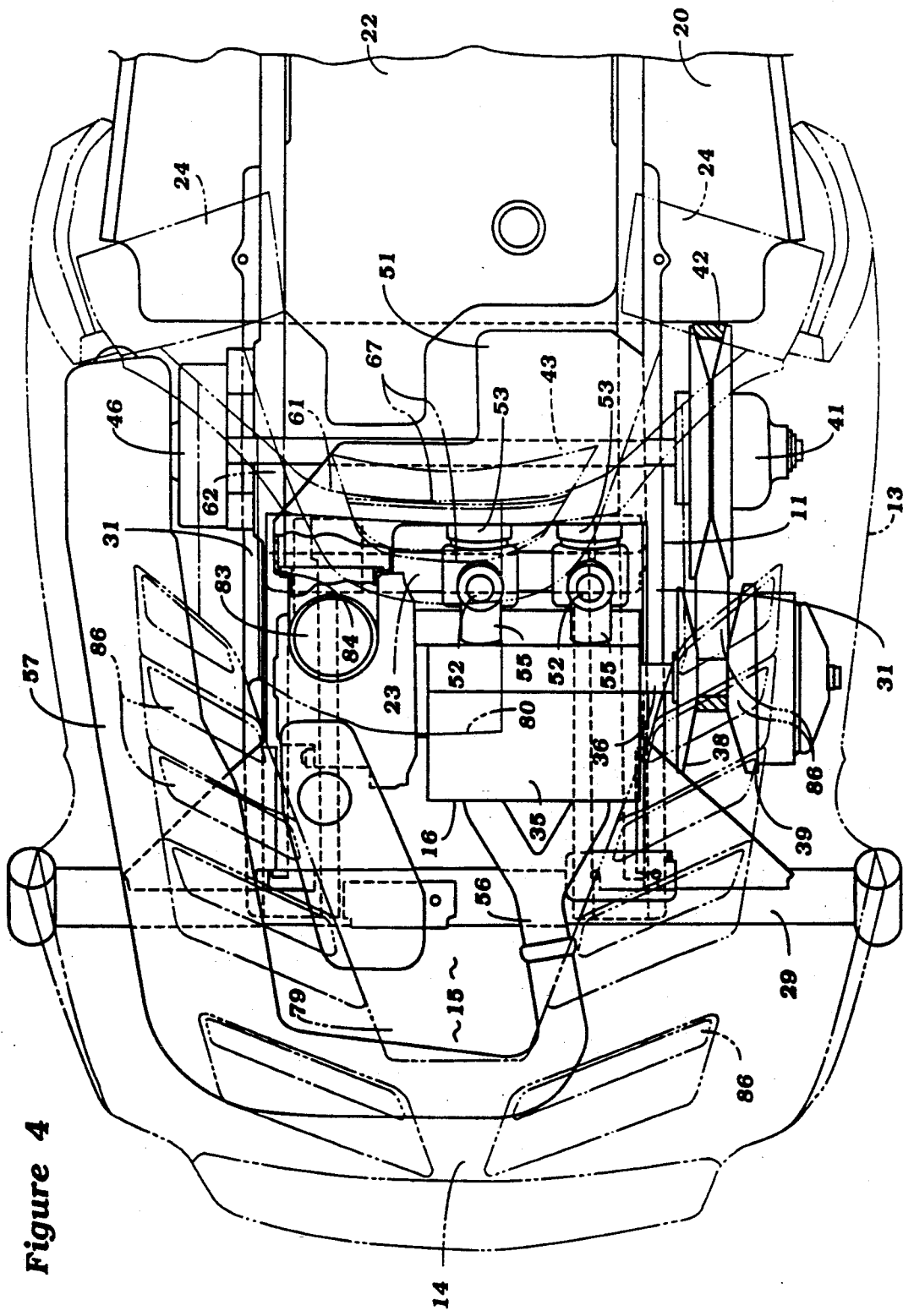
FIG. 4 is a top plan view of the body of the small snowmobile with portions shown in cross section and other portions broken away.

As previously noted, the snowmobile 10 is powered by a power unit 16 which will now be described with particular reference to FIGS. 3 and 4. The power unit 16 is preferably comprised of a two cylinder internal combustion engine which includes a cylinder block 35. The engine drives an engine output shaft that rotates about a horizontally disposed axis extending generally transversely to the longitudinal center line of the snowmobile 10. The output shaft, in turn, drives a crankshaft 36 which is journaled for rotation within a crankcase 37.

The crankshaft 36 drives a transmission which is of the variable speed belt type. In the illustrated embodiment, the transmission includes a drive pulley 38 which is driven by the crankshaft 36 via a centrifugal clutch 39. The drive pulley 38, in turn, drives a driven pulley 41 through a belt 42. The driven pulley 41 is, in turn, coupled in an appropriate manner to a driveshaft 43 for driving a toothed drive belt 44 (see FIG. 1) of the type normally employed for powering such snowmobiles. To this end, there is provided a pair of sprockets 45 drivingly coupled to the driveshaft 43 via a gear assembly 46 and that engage teeth formed on the inner surface of the drive belt 44 for driving it. In addition to the sprockets 45, the drive belt 44 is trained over a pair of rearwardly positioned idler sprockets which are, in turn, journaled on guide rails. The guide rails are suspended relative to the frame assembly 11 by means of trailing arms or links.

The power unit 16 is provided with an induction system that is comprised of an air box or plenum chamber 51 that is positioned over the transmission within the body 12. The air box 51 draws atmospheric air into the engine compartment 15 in a manner to be described and delivers the air to carburetors 52 through a conduit 53. The air box 51 also acts as an intake silencer for the incoming air. The carburetors 52, in turn, discharge a fuel/air mixture into the cylinders of the engine or power unit 16 through an intake manifold 54 affixed to the carburetors 52 by means of couplings 55.

The power unit 16 is also provided with an exhaust system for discharging the exhaust gases from the cylinders of the engine to the atmosphere. This exhaust system includes an exhaust pipe 56, a muffler 57 and a tail pipe affixed to the muffler 57.

Referring now to FIGS. 3 through 8, in accordance with the invention, an air intake opening 61 is provided through the upper portion of the body 12 between an inwardly extending piece 62 of the shroud 14 and the cover piece 23 for inducting air from the atmosphere. Upon entering this opening 61, the air flows into a cavity, indicated by the reference numeral 63, which is positioned upwardly of the cover piece 23 and below a generally disc-shaped filter 65 carried by a supporting fixture 64 that is positioned at the forward end of the cavity 63. The cover piece 23 includes a raised portion 66 with louver-type vent ports 67 above and below through which warm air from the engine compartment 15 travels and mixes with the colder atmospheric air in the cavity 63 so that the induction air will be warmed up to a suitable temperature before being drawn through the filter 65 by the air box 51 of the induction system.

The filter 65 is disposed within the supporting fixture 64 in a generally horizontal manner across the upper forward portion of the cavity 63 such that the air within the cavity 63 is drawn in a generally upward direction through the filter 65. With this construction, the filter 65 not only prevents snow and ice from entering the induction system but also prevents those elements from clogging the filter 65, while still allowing for adequate air flow. Even if some snow or ice adheres to the bottom surface of the filter 65, it will normally fall off as a result of its own weight or it will be melted off by the warmer air coming up through the vents 67 before any clogging or freezing of the filter 65 can occur.

The supporting fixture 64 is mounted to a cowling type surface 68 and extends below an opening 70 formed in the rearward end of the surface 68. The supporting fixture 64 is mounted on either side of the opening 70 at its forward end by a pair of rivets 69 or the like and at either side of its rearward end by a pair of screws 71 or the like. This cowling type surface 68 is positioned inwardly of and in generally parallel relation to the top shroud 14 and is mounted to a pair of bosses 72, extending downwardly from the shroud 14, by the screws 71 and by additional screws 73. This cowling surface 68 acts as an air intake guide and cooperates with the underside of the shroud 14 in defining an air intake passage 74 for the air mixture after it flows through the filter 65 and opening 70.

Figure 5:
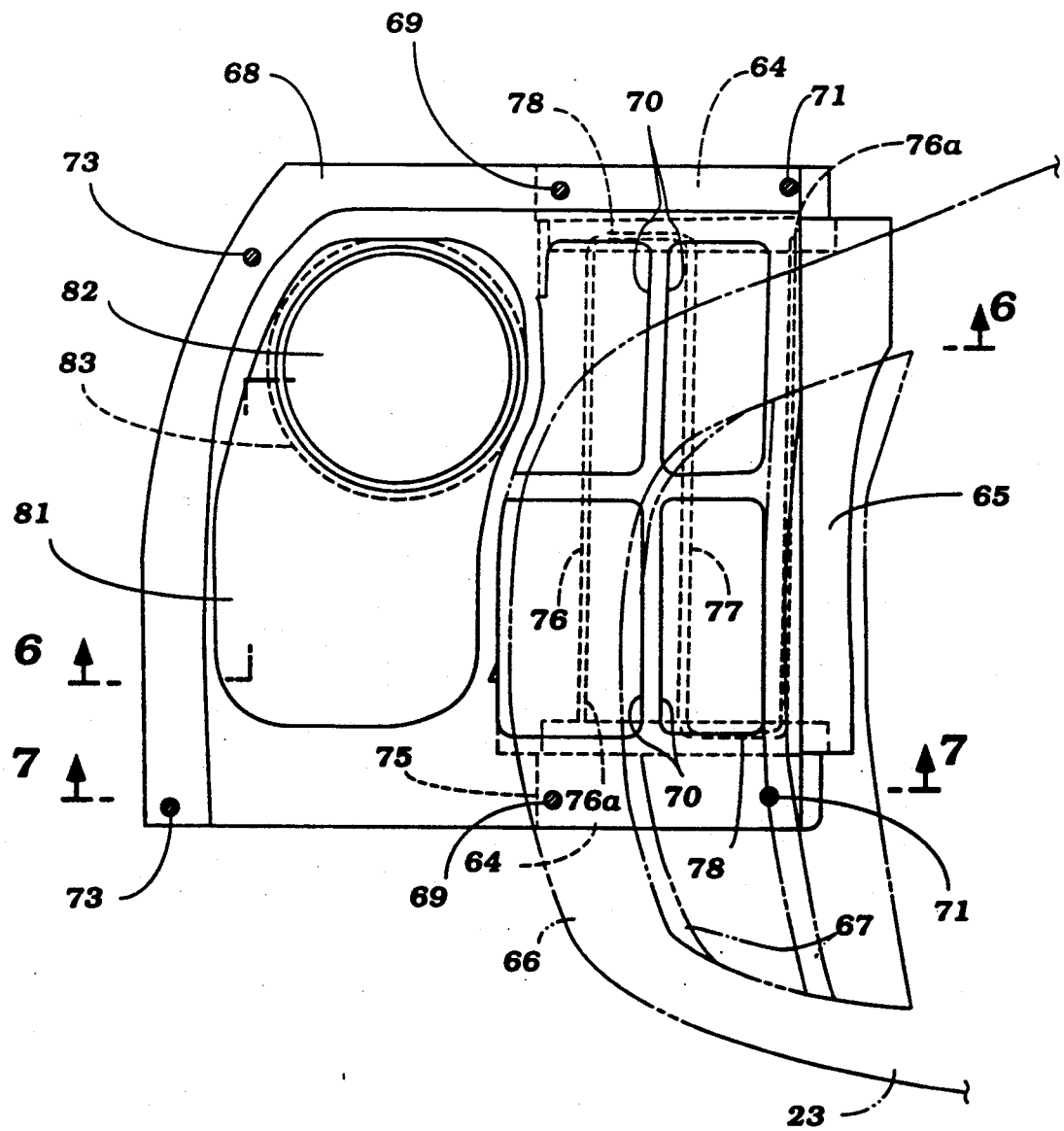
FIG. 5 is a top view of a portion of the body of the small snowmobile showing the filter bracket assembly.

The supporting fixture 64 includes a pair of filter bracket pieces 75 which extend downwardly from around the opening 70 and then inwardly to define a pair of supporting ledges. A generally S-shaped support member 76 is carried on the ledges of the filter bracket 75 and includes three segments which extend transversely between the opposing ledges. The transversely extending members also extend upwardly to form filter supports 77 upon which the filter 65 is seated, and are interconnected by connecting segment 78. The ends 76a of the support member 76 rest on opposite ledges on opposite ends at a diagonal to one another. The filter 65 rests on the filter supports 77 of the support member 76 and is held in place at its top surface by a portion of the cowling surface 68 which extends both latitudinally and longitudinally across the opening 70, as shown in FIG. 5.

Positioned forwardly of the cowling 68 is a sound absorbing member 79 preferably made of urethane foam which is bonded to the under side of the shroud 14. An inner surface 80 of the sound absorbing member 79 is in close proximity to the forward end of the surface 68 and acts to partition off the forward end of the air intake passage 74 from the engine compartment 15. This member 79 also serves to absorb engine noises.

After the air mixture flows down the air intake passage 74, it is drawn through an opening extending downwardly through the forward portion of the surface 68 which mates with a downwardly extending outlet pipe 81 having an air outlet 82 at its lower end. An intake pipe 83 is affixed to the air box 51 by means of a suitable coupling 84 and has its intake opening positioned below and in general alignment with the air outlet 82 so that the air mixture may flow from the outlet pipe 81 into the intake pipe 83 and then into the air box 51 of the engine induction system.

As a result of this construction and arrangement, colder outside air can be inducted through the opening 61 and supplied to the engine induction system without accumulating in the engine compartment 15 so as to increase the charging efficiency of the intake air. In addition, the filter 65 prevents snow from being sucked into the induction system and is positioned within the air flow path so that it cannot be easily clogged.

Figure 6:
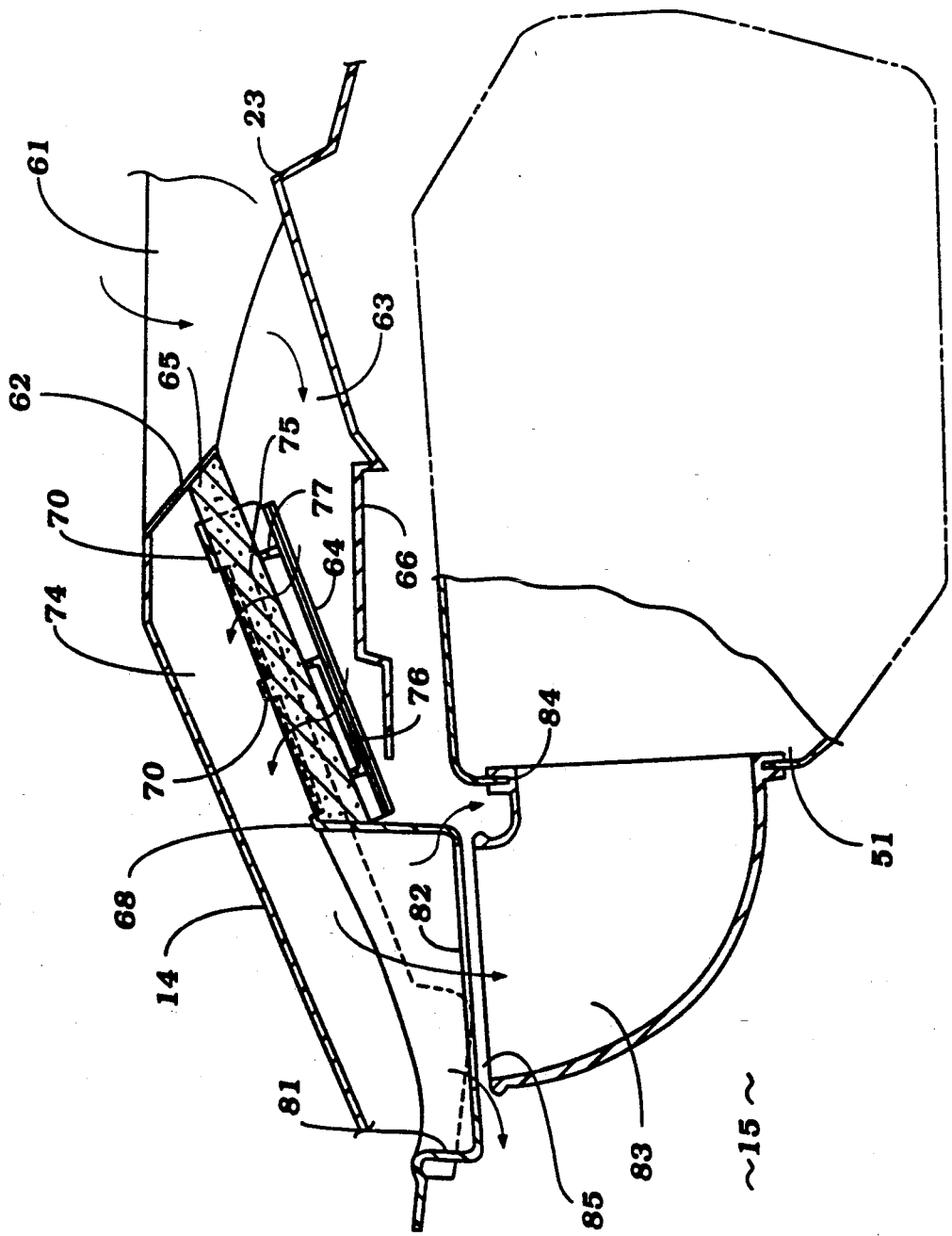
FIG. 6 is a cross sectional view taken along line 6—6 in FIG. 5.
Figure 7:
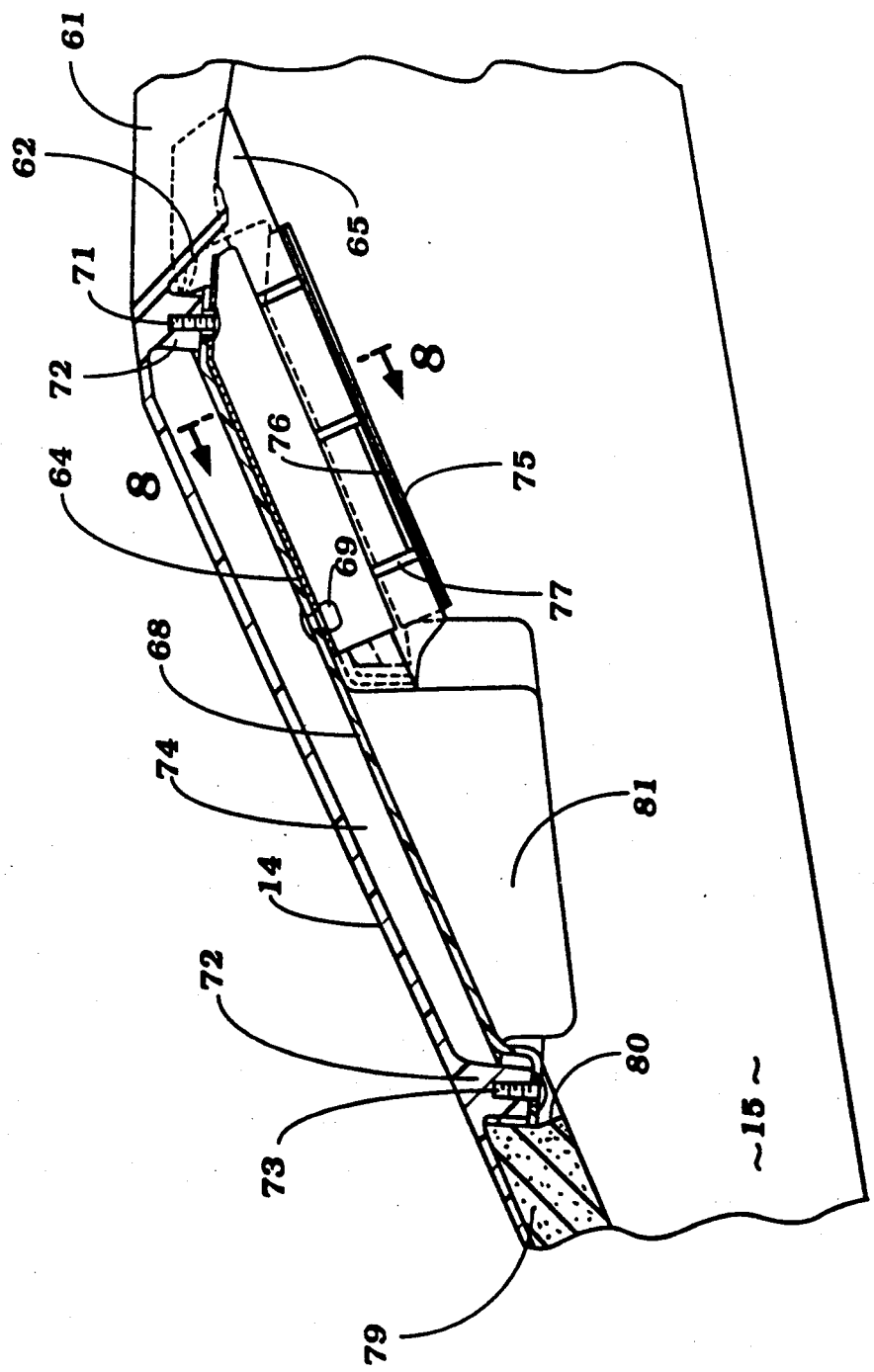
FIG. 7 is a cross sectional view taken along line 7—7 in FIG. 5.
Figure 8:
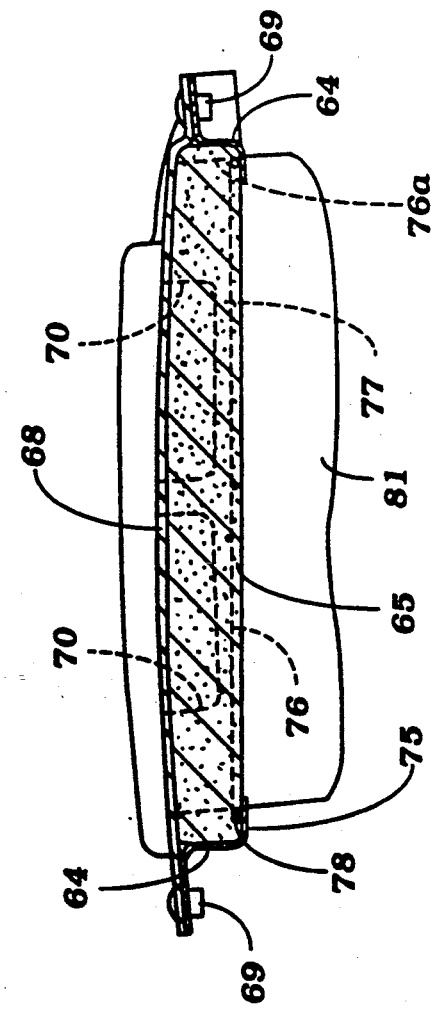
FIG. 8 is a cross sectional view taken along line 8—8 in FIG. 7.

In accordance with the invention, however, there is provided a gap 85 between the air outlet 82 and the intake opening of the pipe 83 which allows part of the air mixture to leak out into the engine compartment 15, as shown by the arrows in FIG. 6, so as to cool the engine compartment 15 and to prevent the engine components including the air box 51 and carburetors 52 from overheating. Furthermore, the shroud 14 is formed with inlet ports 86 for providing additional circulation through the interior of the body 12.

It should be noted that the surface 68 and outlet pipe 81 are formed integrally with the shroud 14 and will be pivoted upward when the shroud 14 is opened. However, the gap 85 prevents any contact between the outlet pipe 81 and the intake pipe 83 when the shroud 14 is closed. This gap 85 is also advantageous in that it is able to accommodate minor dimensional errors with respect to the manufacture and assembly of the surface 68 and intake pipe 83.

From the foregoing description, it should be readily apparent that an effective system has been provided for supplying air having a high charging efficiency to the induction system of a snowmobile, while at the same time reducing the likelihood of any snow or ice from entering the induction system. Moreover, it is to be understood that the foregoing description is that of a preferred embodiment of the invention and that various changes and modifications may be made without departing from the spirit and scope of the invention, as defined by the appended claims. For example, although carburetors are employed in the illustrated embodiment, a fuel injection system may be employed instead of the carburetors.

I claim:

1. An air intake system for a vehicle comprising an internal combustion engine having an induction system, a body including a top shroud portion which cooperates in defining an engine compartment wherein said engine and induction system are contained, said body having an opening, formed at least in part by the top shroud portion, for inducting air from the atmosphere, passage means including a cavity in communication with said opening and defining an air flow path from said opening to said induction system so that air flows from said opening to said induction system without accumulating in said engine compartment, and a filter element positioned above said cavity between said opening and said induction system across said air flow path such that the air flows in a generally upward direction through said filter element, and wherein said body comprises vent ports communicating said engine compartment with said cavity so as to enable air within said engine compartment to flow into said cavity and to mix with the air inducted from the atmosphere.

2. An air intake system as recited in claim 1, wherein said passage means comprises an intake passage through which the air flows after flowing through said filter element.

3. An air intake system as recited in claim 2, wherein said passage means further comprises an outlet pipe member having one end connected to said intake passage and the other end defining an outlet opening, and an intake pipe member having one end connected to said induction system and the other end defining an intake opening in proximity to and in communication with said outlet opening so that air flows from said outlet opening into said intake opening, said outlet opening and intake opening being separated by a gap so as to enable some air to flow from said outlet opening into said engine compartment.

4. An air intake system as recited in claim 3, wherein said body comprises a bottom cover and a top cover pivotally connected to said bottom cover for movement between a closed position and an open position wherein said top cover is pivoted upward relative to said bottom cover, said intake passage and outlet pipe member being formed integrally with said top cover.

* * * * *